United States Patent
Kosugi (10) Patent No.: US 7,742,253 B2
(45) Date of Patent: Jun. 22, 2010

(54) STORAGE DEVICE AND CONTROL DEVICE (75) Inventor: Tatsuhiko Kosugi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 253 days.

(21) Appl. No.: 11/975,945

(22) Filed: Oct. 23, 2007

(65) Prior Publication Data
US 2008/0174903 A1 Jul. 24, 2008

(30) Foreign Application Priority Data
Jan. 19, 2007 (JP) ............... 2007-009716

(51) Int. Cl.
*G11B 21/02* (2006.01)
(52) U.S. Cl. ...................................... 360/75
(58) Field of Classification Search ............. 360/77.04, 360/78.14, 77.02, 77.06, 75, 48, 77.08, 29
See application file for complete search history.

(56) References Cited

U.S. PATENT DOCUMENTS

| | | | |
|---|---|---|---|
| 6,122,117 A * | 9/2000 | Aikawa | 360/29 |
| 6,166,875 A | 12/2000 | Ueno et al. | |
| 6,961,203 B1 * | 11/2005 | Baker | 360/77.08 |
| 7,002,315 B2 | 2/2006 | Aono et al. | |
| 7,365,927 B2 * | 4/2008 | Takamatsu et al. | 360/48 |
| 2004/0004783 A1 | 1/2004 | Takaishi et al. | |
| 2005/0289262 A1 | 12/2005 | Sutardja | |
| 2006/0061318 A1 | 3/2006 | Aono et al. | |
| 2008/0030888 A1 * | 2/2008 | Brunnett et al. | 360/75 |

FOREIGN PATENT DOCUMENTS

| | | |
|---|---|---|
| JP | 2000-357372 | 12/2000 |
| JP | 2004-005914 | 1/2004 |
| JP | 2006-12139 | 1/2006 |
| KR | 1999-0036516 | 5/1999 |
| KR | 2003-0091822 | 12/2003 |
| KR | 2004-0004128 | 1/2004 |

* cited by examiner

*Primary Examiner*—Fred Tzeng
(74) *Attorney, Agent, or Firm*—Greer, Burns & Crain, Ltd.

(57) ABSTRACT

A storage device and a control device include a first DSP, a second DSP, and a Servo MPU for controlling a position of a head with respect to a storage medium. The Servo MPU instructs the first DSP and the second DSP. The first DSP carries out calculation of at least any of a demodulation calculation that is a calculation relating to demodulation of servo information and a digital filter calculation based on the instruction from the Servo MPU. The first DSP carries out a correction calculation that is a calculation relating to correction of the position based on the instruction from the Servo MPU. The Servo MPU carries out control of the position based on a result of the calculation carried out by the first DSP and the second DSP.

20 Claims, 5 Drawing Sheets

| | |
|---|---|
| MAC X(CONST1),Y(SumXn) | (S111) |
| MAA Y(PES),X(SIN_NW) | (S112) |
| STR Y(SumXn) | (S113) |
| | |
| MAC X(CONST1),Y(SumYn) | (S111) |
| MAA Y(PES),X(COS_NW) | (S122) |
| STR Y(SumYn) | (S123) |

FIG.6

| | |
|---|---|
| MAC X(COS_NW),Y(SumXn) | (S211) |
| MAA X(SIN_NW), Y(SumYn) | (S212) |

FIG.7

| | | |
|---|---|---|
| MAC | X(CoeffX0),Y(DataX0),LDLY | (S312) |
| MAA | X(CoeffX1),Y(DataX1),LDLY,STLY | (S313) |
| MAA | X(CoeffX2),Y(DataX2),STLY | (S314) |
| MAA | X(CoeffY1),Y(DataY1),LDLY | (S315) |
| MAA | X(CoeffY2),Y(DataY2),STLY | (S316) |
| STR | Y(DataY1),Q14,CLP | (S317) |

STORAGE DEVICE AND CONTROL DEVICE

BACKGROUND OF THE INVENTION

1. Field of the Invention

The present invention relates to a storage device and a control device that carry out a control by using a plurality of processors.

2. Description of the Related Art

A function of an integrated circuit (IC) that controls a hard disk device has been improved year by year. On the other hand, cost needs to be the same as that of the conventional ones, and integration of the IC has inevitably been increasingly demanded.

When the integration and functional improvement of the IC are attempted, power consumption is significantly increased and heat generation becomes large. However, since it is difficult to take measures for heat radiation of an integrated circuit of a hard disk, an amount of the heat generation needs to be restricted. There is a method of achieving a demand for improving the function that improves a clock frequency of a processor. However, improvement in the clock leads to an increase in the power consumption. In order to achieve a plurality of the processors with the lower number of ICs, the restriction of the power consumption is an important factor.

As a conventional technique that relates to the present invention, there is an optical disk device having a control circuit formed on one chip (for example, refer to Patent Document 1: Jpn. Pat. Appln. Laid-Open Publication No. 2004-5914).

In the integrated circuit for disk control, the number of the ICs decreases year by year due to progress in integration. However, performance requested for a device is more and more enhanced. In addition, an integration degree of the integrated circuit is about to be restricted in view of the heat generation and the power consumption. In addition, since a gate size directly affects the cost, a gate scale needs to be restricted to be small.

In a case where a control part of the hard disk device is configured with a single processor, control of an HDC (Hard Disk Controller) (control of an interface with a host), control of an RDC (Read Channel) (parameter transfer at read and write), and control of an SVC (Servo combo driver) (indication of a drive current value of a VCM (Voice Coil Motor) and a drive current value of an SPM (Spindle Motor)) need to be carried out by one main processor.

In the recent hard disk device, a servo sample frequency has increased to around 50 kHz, and servo sample time has reduced to around 20 μsec. In order to carry out the above control and calculation within the servo sample time, performance of the clock frequency of 500 MHz or higher is required for the main processor. Although this is not an impractical speed in the 90 nm process generation, not only a technique of pipelining becomes necessary, but also increase in a chip core area and increase in the heat generation along with a rise in the clock occur. Therefore, it becomes difficult to obtain a chip in practice.

SUMMARY OF THE INVENTION

The present invention has been made in view of resolving the problems described above. An object of the present invention is to provide a storage device and a control device that restrict increase in the clock frequency and the gate scale.

In order to achieve the object described above, the present invention includes: a first digital signal processor; a second digital signal processor; and a first control unit that controls a position of a head with respect to a storage medium, wherein the first control unit instructs the first digital signal processor and the second digital signal processor, the first digital signal processor carries out at least any of a demodulation calculation that is a calculation relating to demodulation of servo information and a digital filter calculation based on an instruction from the first control unit, the second digital signal processor carries out correction calculation that is a calculation relating to correction of the position based on the instruction from the first control unit, and the first control unit controls the position based on a result of the calculation carried out by the first digital signal processor and the second digital signal processor.

According to the present invention, increase in the clock frequency and the gate scale in the storage device can be restricted.

DETAILED DESCRIPTION OF THE PREFERRED EMBODIMENTS

Hereinafter, an embodiment of the present invention will be described with reference to the accompanying drawings.

In the present embodiment, an example where a storage device of the present invention is applied to a hard disk device will be described.

First, a configuration of the hard disk device according to the present embodiment will be described.

Figure 1:
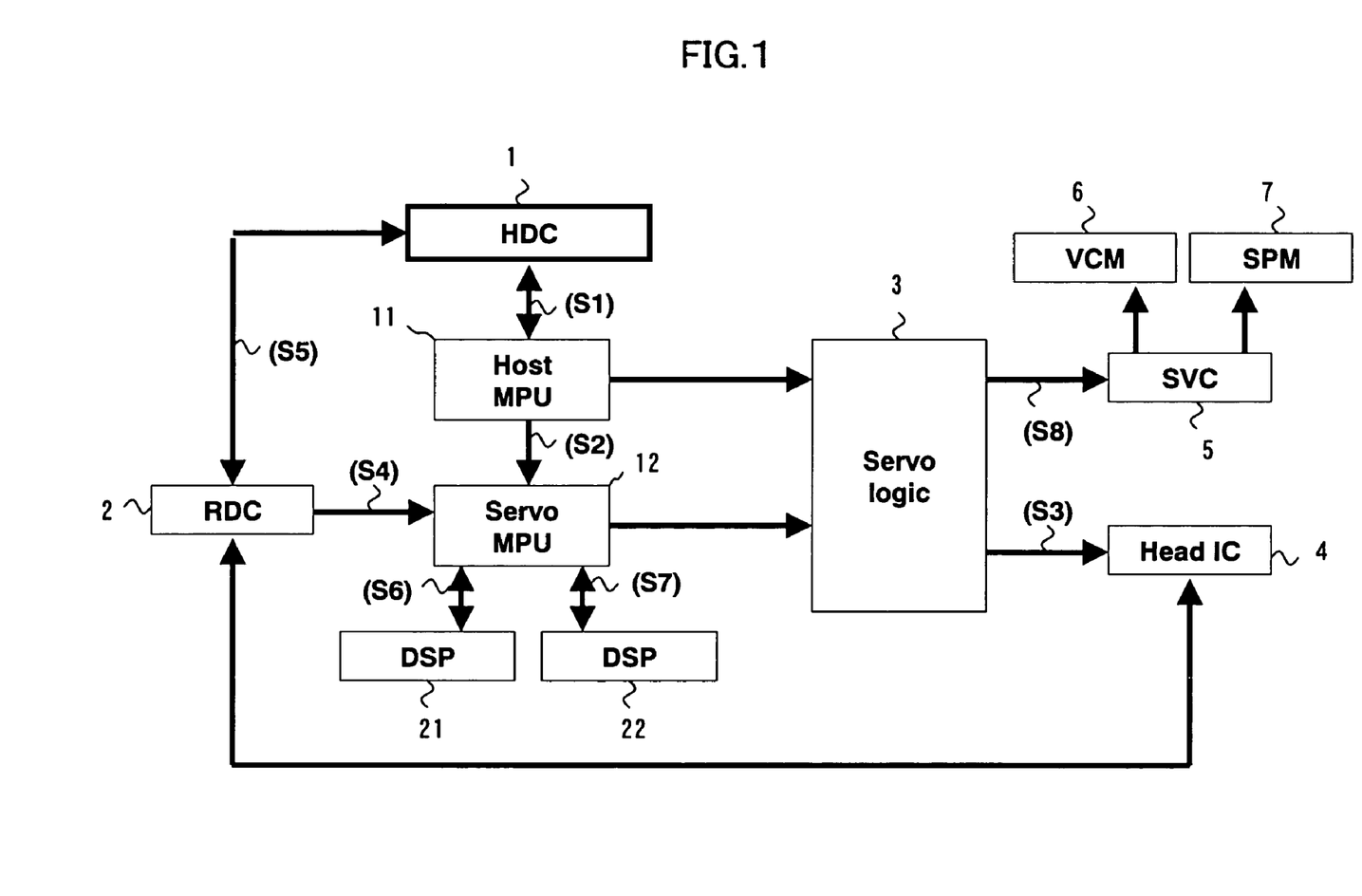
FIG. 1 is a block diagram showing an example of a configuration of a hard disk device according to the present embodiment.

FIG. 1 is a block diagram showing an example of the configuration of the hard disk device according to the present embodiment. The hard disk device includes an HDC 1, an RDC 2, a Servo logic 3, a Head IC 4, an SVC 5, a VCM 6, an SPM 7, a Host MPU (Micro Processing Unit) 11, a Servo MPU 12, and Digital Signal Processors (DSPs) 21 and 22.

The HDC 1 mainly carries out interface protocol control, data buffer control, and disk format control. The RDC 2 carries out modulation and demodulation of data. The Servo logic 3 mediates a control signal from the Host MPU 11 and the Servo MPU 12 to the Head IC 4 and the SVC 5. The Head IC 4 carries out setting and so on of amplification in write and read based on the control signal from the Servo MPU 12. The SVC 5 supplies a drive current of the VCM 6 and the SPM 7 based on the control signal from the Servo MPU 12. The VCM 6 is a motor that moves the head. The SPM 7 is a motor that rotates a disc medium. The Host MPU 11 carries out host interface control of the HDC 1. The Servo MPU 12 carries out servo control via the Servo logic 3. The DSPs 21 and 22 are general DSPs, a scale of which is made smaller by omitting functions of interrupt processing and so on from a general DSP.

Next, operation of the hard disk device according to the present embodiment will be described.

First, the HDC 1 is connected to a host (higher level device), receives a command from the host, and sends the command to the Host MPU 11 (S1). After receiving the command, the Host MPU 11 allows the Servo MPU 12 to execute a seek when the command is a seek command (S2), and to execute a read/write between the HDC 1 and the RDC 2 when the command is a Read/Write (R/W) command (S5).

At the time of seek, the Servo MPU 12 allows, via the Servo logic 3, the Head IC 4 to execute head switching if a head change is necessary at the seek (S3).

At the time of R/W, the Servo MPU 12 sends instruction for calculation, such as demodulation calculation and digital filter calculation, to the DSP 21, and obtains a calculation result (S6). In addition, the Servo MPU 12 instructs to perform calculation, such as imaginary circle correction coefficient calculation, imaginary circle correction calculation, and eccentricity correction calculation, to the DSP 22 based on a demodulation calculation result, and obtains a calculation result (S7). Next, the Servo MPU 12 calculates a drive current value of the VCM 6 by using the demodulation calculation result and an eccentricity correction calculation result, and sends the drive current value to the SVC 5 via the Servo logic 3.

Next, parallel processing at the time of R/N after shipment from the factory carried out by the Servo MPU 12 and the DSPs 21 and 22 will be described.

Figure 2:
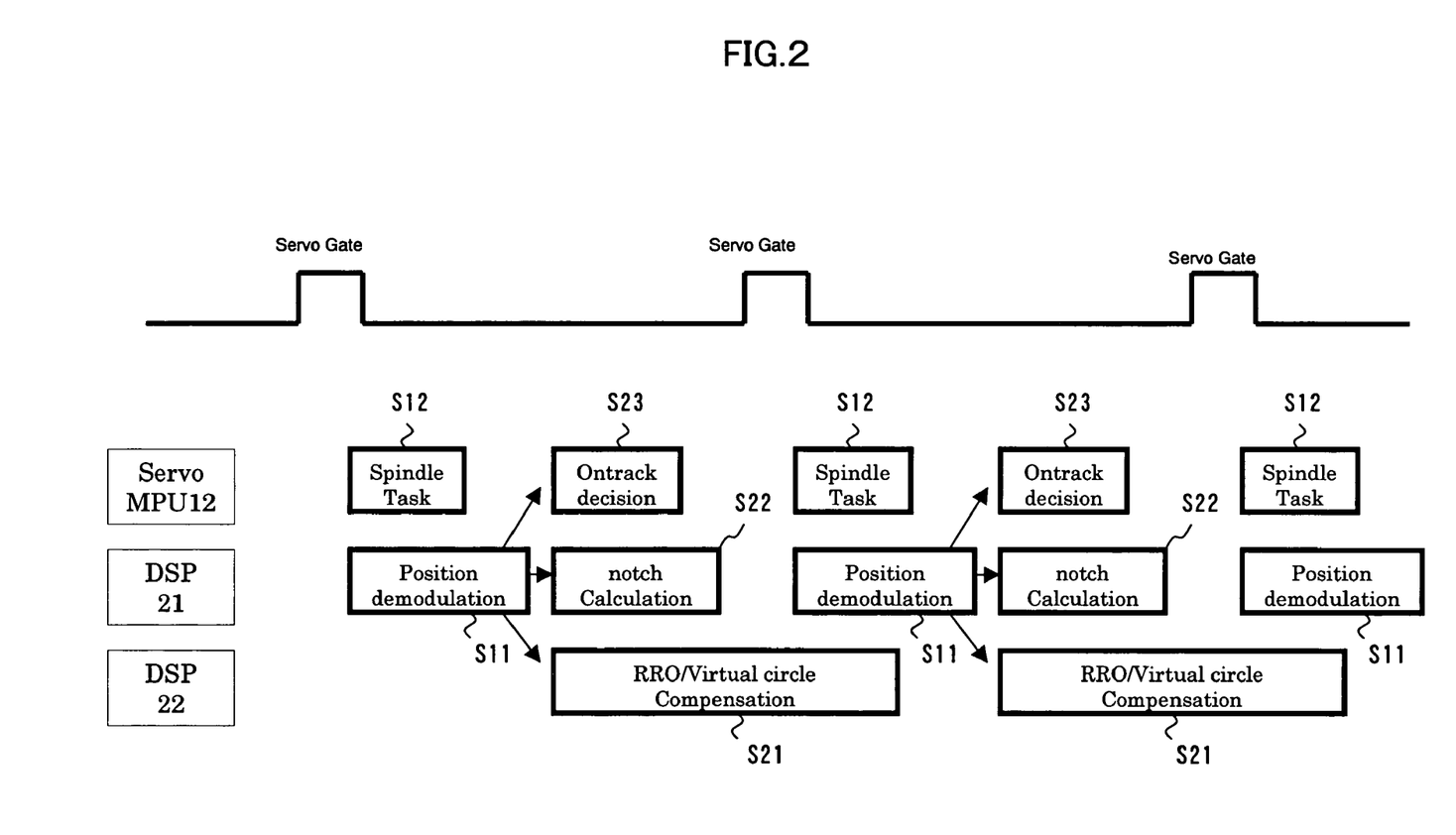
FIG. 2 is a time chart showing an example of parallel processing at R/W according to the present embodiment.

FIG. 2 is a time chart showing an example of the parallel processing at the time of R/W according to the present embodiment. In FIG. 2, a horizontal axis indicates time. A first line from the top in FIG. 2 shows timing of a servo gate, the second line from the top shows processing carried out by the Servo MPU 12, the third line from the top shows processing carried out by the DSP 21, and a bottom line shows processing carried out by the DSP 22.

Immediately after the servo gate, the Servo MPU 12 instructs the DSP 21 demodulation calculation of servo information (Position demodulation) (S11), and carries out control of the SPM 7 (Spindle Task) (S12). Next, the Servo MPU 12 instructs the DSP 22 to perform imaginary circle correction calculation and the eccentricity correction calculation (PRO/Virtual circle compensation) using positional information (S21), instructs the DSP 21 to perform notch filter calculation for applying a notch filter to the positional information (notch calculation) (S22), and carries out on-track determination using the positional information (S23). The processings of S11 to S23 are repeated thereafter.

According to the parallel processing, processings can be distributed to the Servo MPU 12, the DSPs 21 and 22. Further, all the processings do not need to be finished within servo sample time. Therefore, performance of each processor can be set to significantly low level as compared with a conventional single processor.

Next, the DSP 21 will be described.

In accordance with the instruction of the demodulation calculation from the Servo MPU 12, the DSP 21 obtains servo information which is information of a servo frame read out by the head. The servo information is a waveform obtained by phase-modulating information showing a position. The DSP 21 carries out demodulation of the servo information as the demodulation calculation, and outputs a demodulation result with information of the position as the positional information.

The Servo MPU 12 uses the demodulation result, and carries out the processings S21, S22, and S23 described above.

The DSP 21 has a sin/cos table A for the demodulation calculation. In general, the sin/cos table A is a table of 256 words/360 degrees in which, for ease of retrieval, angles of 0 to 360 degrees are divided into 256 phases, and values of sine and cosine at each angle are allocated as one word.

In addition, in accordance with instruction for digital filter calculation from the Servo MPU 12, the DSP 21 carries out the digital filter calculation for carrying out filtering of the positional information. Here, a digital filter is a low-pass filter or a notch filter for removing a resonance frequency. The DSP 21 outputs the filtered positional information.

Next, the DSP 22 will be described.

The DSP 22 carries out calculation, such as the imaginary circle correction coefficient calculation, the imaginary circle correction calculation, and the eccentricity correction calculation in accordance with instruction from the Servo MPU 12, and outputs the calculation result.

The DSP 22 has a sin/cos table B corresponding to the number of servo frames on a disc medium for the imaginary circle correction coefficient calculation, the imaginary circle correction calculation, and the eccentricity correction. For example, when the disc medium has 300 servo frames in one cycle, the sin/cos table B is a table of 300 words/360 degrees in which angles of 0 to 360 degrees are divided into 300 phases, and values of sine and cosine at each angle are allocated as one word. In the DSP 22, when a normal table which has no relationship with the number of servo frames such as the sin/cos table A is used, processing of calculating a value by linear interpolation is necessary. However, by using the sin/cos table B corresponding to the servo frame, such a processing can be omitted.

Next, imaginary circle correction will be described.

First, calculation of the imaginary circle correction coefficient as a preparation for the imaginary circle correction is carried out before shipment from the factory. In a case where the disc medium in which the servo frame is written by an STW (Servo Track Writer) and so on in advance is mounted in the hard disk device, there is a case where a center of the servo frame and a rotational center of the disc medium are shifted. Here, if the head is attempted to follow the servo frame, the head needs to be driven at all times in order to correct shift in a track direction. The imaginary circle correction coefficient is a coefficient for correcting a value obtained from the servo frame so as not to flow a drive current into the VCM 6 (not to move a head position). That is, a path of the head is configured to be a circle (imaginary circle) centering on the rotational center of the disc medium. The imaginary circle correction coefficient is calculated in the factory and recorded in a system area.

In addition, in the imaginary circle correction, the imaginary circle correction coefficient and a postcode are used in combination. The postcode is recorded in each servo frame, and the servo frame length becomes long when many bits are recorded. Therefore the postcode has length of about 4 to 6 bits. In this case, a correction range is around ±0.2 to ±0.5 tracks. At the time of use by the user after shipment from the factory, the value obtained from the servo frame needs to be corrected at all times by using the imaginary circle correction coefficient of the system area and the postcode of the servo frame. Therefore, high performance is required for the single processor.

In addition, in calculating the imaginary circle correction coefficient, frequency analysis of past positional information (PES: Position Error Signal) of the head is carried out. Here, the positional information shows positional shift of the head with respect to a circle of the servo frame. A cycle of a first-order (fundamental frequency) component which is the number of rotations of the SPM 7 is extremely long, and the postcode cannot cover such a long cycle. Due to the above reason, the imaginary circle correction is carried out with respect to low-order components including the first-order component to around third-order component in recent years, and postcode correction is carried out for further higher-order components.

In the present embodiment, before shipment from the factory, the DSP 22 which has received the instruction for the imaginary circle correction coefficient calculation from the Servo MPU 12 carries out the frequency analysis of the positional information obtained from the demodulation calculation by using the sin/cos table B, and outputs a coefficient of a predetermined low-order component in the frequency area of the positional information as the imaginary circle correction coefficient. The Servo MPU 12 records the imaginary circle correction coefficient in the system area.

In addition, after shipment from the factory, the DSP 22 which has received the instruction for the imaginary circle correction calculation from the Servo MPU 12 obtains the imaginary circle correction coefficient recorded in the system area, calculates the imaginary circle correction value which is a correction value of a time area of the positional information based on the imaginary circle correction value and the sin/cos table B, and corrects the positional information obtained from the demodulation calculation by the imaginary circle correction value.

Next, eccentricity correction will be described.

The eccentricity correction is carried out after shipment from the factory. There is a case where eccentricity occurs in a track of a concentric circular shape that is set before shipment due to disturbance and secular change after shipment from the factory. The eccentricity correction corrects shift of the head position from the track due to the eccentricity and keeps the head position on the track. Therefore, calculation of the eccentricity correction is carried out at the time of use by the user at all times.

The eccentricity correction performs the frequency analysis on a time change of past positional information. Here, the positional information shows shift of the head position with respect to a circle of the track. A DFT (Discrete Fourier Transform) is used for the frequency analysis. The drive current value of the VCM 6 is normally calculated by carrying out feedback control based on the positional information. By adding an eccentricity correction value obtained by the frequency analysis to the drive current value, shift of the head position due to the eccentricity is cancelled, and the head position can be kept on the track at all times.

Figure 3:
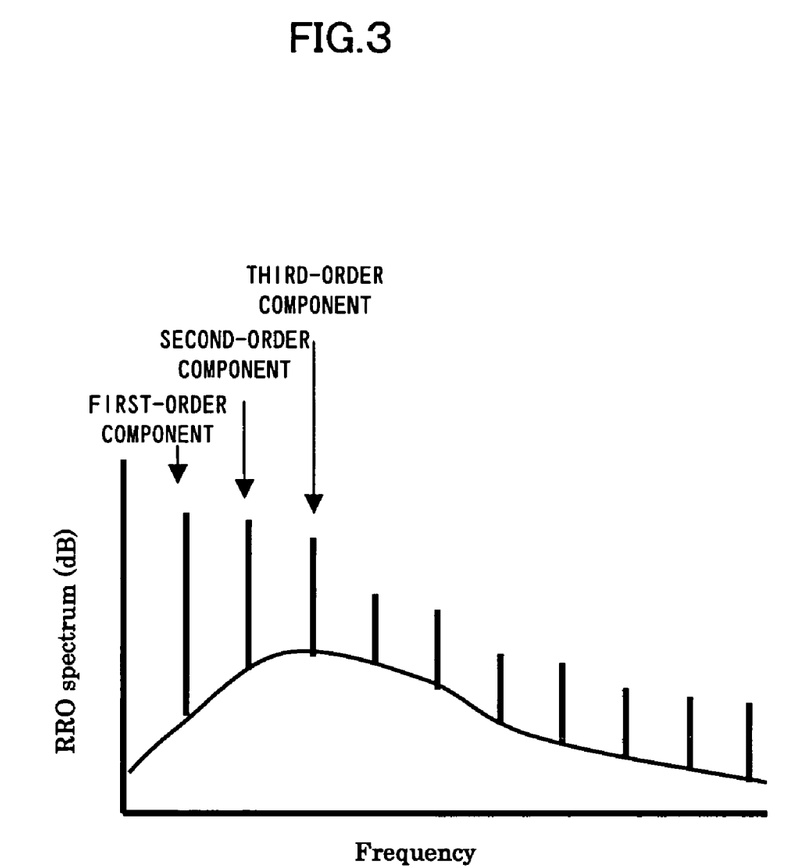
FIG. 3 is a graph showing an example of a result of frequency analysis in eccentricity correction.

FIG. 3 is a graph showing an example of a result of frequency analysis in eccentricity correction. FIG. 3 shows a result of the frequency analysis, where the horizontal axis shows a frequency and the vertical axis shows a RRO (Repeatable Run Out) spectrum [dB]. In the positional information, there appear a second-order and a third-order harmonic components and so on in addition to the first-order (fundamental frequency) component which is the number of rotations of the SPM 7. Basically, although mere removal of the largest first-order component is effective, the eccentricity correction of removing up to around 20th-order component is carried out in recent years since there are components of high order in practice. However, carrying out the eccentric correction from the first-order component to the 20th-order component imposes a heavy processor load, and high performance is required for the single processor.

In the present embodiment, the DSP 22 which has received the instruction for the eccentricity correction calculation from the Servo MPU 12 calculates the eccentricity correction value by using the sin/cos table B and carrying out the frequency analysis of the positional information corrected by the imaginary circle correction calculation. Next, the Servo MPU 12 uses the positional information and the eccentricity correction value and calculates the drive current value of the VCM 6.

Next, details of the DSPs 21 and 22 will be described.

Figure 4:
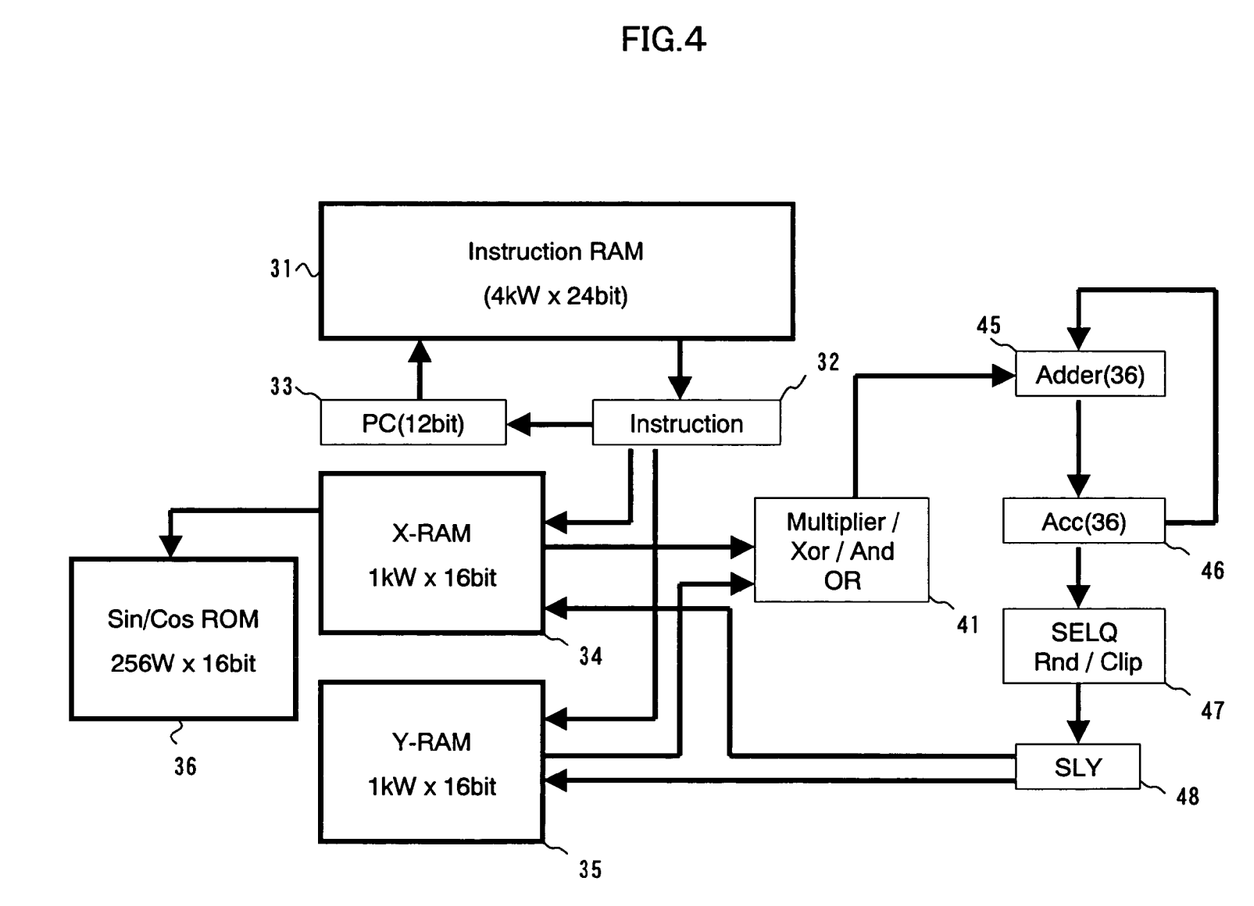
FIG. 4 is a block diagram showing an example of configurations of DSPs 21 and 22 according to the present embodiment.

FIG. 4 is a block diagram showing an example of configurations of the DSPs 21 and 22 according to the present embodiment. The DSPs 21 and 22 use the same core, and include an Instruction RAM 31, an Instruction 32, a Program Counter (PC) 33, an X-RAM 34, a Y-RAM 35, a Sin/Cos ROM 36, a Multiplier 41, an Adder 42, an Accumulator (ACC) 43, a Selector Q (SELQ) 44, and a Selector Y (SLY) 45.

The Instruction RAM 31 is a RAM of 4 kW where 24 bits are 1 W. Each of the X-RAM 34 and the Y-RAM 35 is a RAM of 1 kW where 16 bits are 1 W. The Sin/Cos ROM 36 is a ROM of 256 W where 16 bits are 1 W. Bit width of the PC 33 is 12 bits. Bit widths of each of the adder 45 and the ACC 46 are 36 bits. The SELQ 44 carries out Round (Rnd) processing or Clip processing in accordance with instruction. The SLY 45 selects either the X-RAM 34 or the Y-RAM 35 in accordance with instruction, and stores data.

In the DSP 21, the sin/cos table A described above corresponds to the Sin/Cos ROM 36. In the DSP 22, the sin/cos table B described above is stored in the X-RAM 34 and the Y-RAM 35. The sin/cos table A in the DSP 21 may be stored in a RAM, and the sin/cos table B in the DSP 22 may be stored in a ROM.

Next, an implementation example of the digital filter calculation carried out by the DSP 21 will be described.

Figure 5:
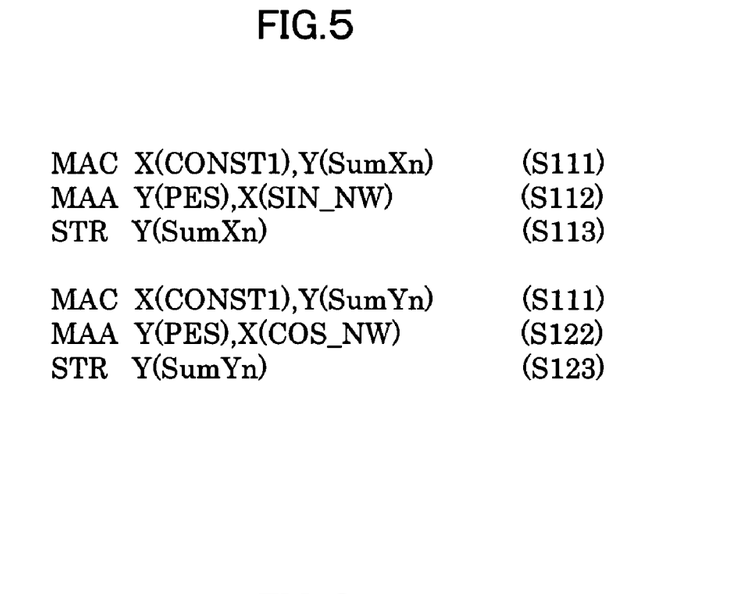
FIG. 5 is a source code showing an example of implementation of digital filter calculation according to the present embodiment.

FIG. 5 is a source code showing an example of implementation of the digital filter calculation according to the present embodiment. First, processing S311 multiplies CoeffX0 of the X-RAM 34 and DataX0 of the Y-RAM 35 in the Multiplier 41, stores a result in the ACC 46, and stores DataX0 in LY. Next, processing S312 multiplies CoeffX1 of the X-RAM 34 and DataX1 of the Y-RAM 35 in the Multiplier 41, stores a result in the ACC 46, and stores LY in DataX1 while storing DataX1 in LY. Next, processing S313 multiplies CoeffX2 of the X-RAM 34 and DataX2 of the Y-RAM 35 in the Multiplier 41, stores a result in the ACC 46, and stores LY in DataX2. Next, processing S314 multiplies CoeffY1 of the X-RAM 34 and DataY1 of the Y-RAM 35 in the Multiplier 41, stores a result in the ACC 46, and stores DataY1 in LY. Next, processing S315 multiplies CoeffY2 of the X-RAM 34 and DataY2 of the Y-RAM 35 in the Multiplier 41, stores a result in the ACC 46, and stores LY in DataY2. Next, processing S316 converts a content of the ACC 46 to a Q14 format in the SELQ 44, carries out Clip, and stores the content in DataY1 of the Y-RAM 35 from the SLY 45.

Next, an implementation example of the eccentricity correction calculation carried out by the DSP 22 will be described.

Figure 6:
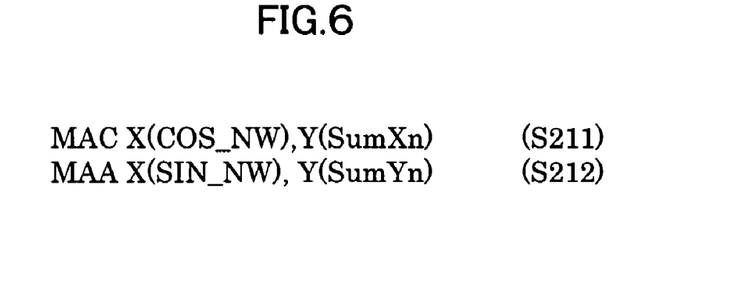
FIG. 6 is a source code showing an example of implementation of DFT calculation according to the present embodiment.
Figure 7:
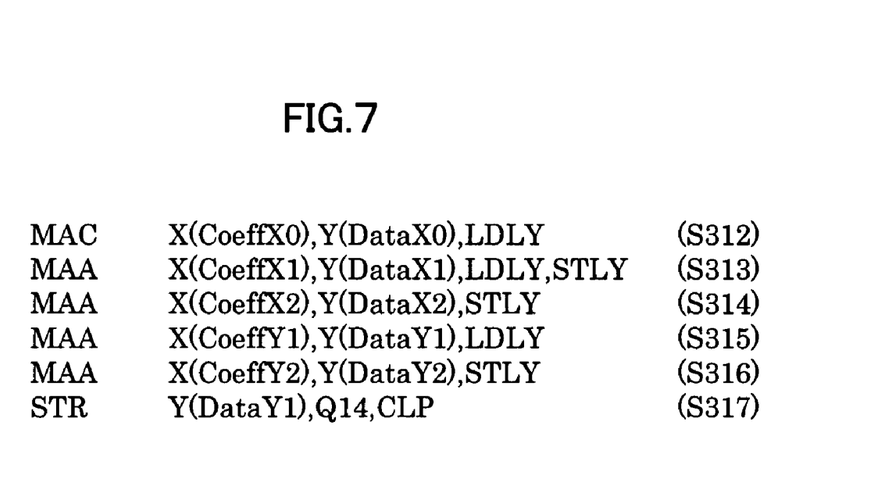
FIG. 7 is a source code showing an example of implementation of correction value calculation according to the present embodiment.

In the eccentricity correction calculation, the DSP 22 carries out DFT calculation for carrying out the frequency analysis of the positional information and correction value calculation for determining the eccentricity correction value based on a result of the DFT calculation. When the positional information is PES, the DFT calculation is expressed by the following formula.

$X_n = PES \times \cos(n\omega)$ $Y_n = PES \times \sin(n\omega)$

Where n=1, 2, 3, ... 8.

FIG. 6 is a source code showing an example of implementation of the DFT calculation according to the present embodiment. First, processing S111 multiplies CONST1 of the X-RAM 34 and SumXn of the Y-RAM 35 in the Multiplier 41, stores a result in the ACC 46. Next, processing S112 multiplies PES of the Y-RAM 35 and SIN_NW of the X-RAM 34 in the Multiplier 41, adds a result to a content of the ACC 46, and stores in the ACC 46. The processing S113 stores the content of the ACC 46 in SumXn of the Y-RAM 35 from the SLY 45.

In a similar manner, processing S121 multiplies CONST1 of the X-RAM 34 and SumYn of the Y-RAM 35 in the Multiplier 41, and stores a result in the ACC 46. Next, processing S122 multiplies PES of the Y-RAM 35 and COS_NW of the X-RAM 34 in the Multiplier 41, adds a result to a content of the ACC 46, and stores in the ACC 46. The processing S123 stores the content of the ACC 46 in SumYn of the Y-RAM 35 from the SLY 45.

In addition, the correction value calculation is expressed in the following formula.

$$\Sigma(Xn \times \cos(n\omega) + Yn \times \sin(n\omega))$$

FIG. 7 is a source code showing an example of implementation of the correction value calculation according to the present embodiment. First, processing S211 multiplies COS_NW of the X-RAM 34 and SumXn of the Y-RAM 35 in the Multiplier 41, stores a result in the ACC 46. Next, processing S212 multiplies SIN_NW of the X-RAM 34 and SumYn of the Y-RAM 35 in the Multiplier 41, adds a result to a content of the ACC 46, and stores a result in the ACC 46.

According to the present embodiment, a plurality of the processors (the Host MPU 11, the Servo MPU 12, the DSPs 21 and 22) are provided, and functions are distributed to each of the processors, thereby performance of the individual processors can be restricted. Each processor only needs to have a memory with capacity necessary for itself. In addition, each processor only needs to have operational speed of about 200 MHz to 300 MHz in a 90 nm process generation. Therefore, power consumption, die size, and cost of the individual processors can be restricted, and thus the cost of the entire hard disk device can be restricted.

The first control unit corresponds to the Servo MPU 12 in the embodiment. Further, the first digital signal processor corresponds to the DSP 21 in the embodiment. Furthermore, the second digital signal processor corresponds to the DSP 22 in the embodiment. In addition, the second control unit corresponds to the Host MPU 11 in the embodiment.

Here, in the storage device, for example, a magnetic disc device, an optical disc device, magneto-optical disc device, and so on may be included.

What is claimed is:

1. A storage device comprising:
a first digital signal processor;
a second digital signal processor; and
a first control unit that controls a position of a head with respect to a storage medium, wherein
the first control unit is provided separately from and instructs the first digital signal processor and the second digital signal processor,
the first digital signal processor carries out at least any of a demodulation calculation that is a calculation relating to demodulation of servo information and a digital filter calculation based on an instruction from the first control unit,
the second digital signal processor carries out a correction calculation that is a calculation relating to a correction of the position of the head based on the instruction from the first control unit, and
the first control unit controls the position of the head based on a result of the calculation carried out by the first digital signal processor and the second digital signal processor.

2. The storage device according to claim 1, wherein
the demodulation calculation calculates positional information of the head by demodulating the servo information read out from the storage medium by the head.

3. The storage device according to claim 1, wherein
the second digital signal processor carries out the correction calculation based on the positional information calculated by the first digital signal processor.

4. The storage device according to claim 1, wherein
the correction calculation includes an imaginary circle correction coefficient calculation that calculates an imaginary circle correction coefficient for correcting the position of the head so that a track in the storage medium becomes a circle centering on a rotational center of the storage medium.

5. The storage device according to claim 4, wherein
the correction calculation includes an imaginary circle correction calculation for correcting the positional information based on the imaginary circle correction coefficient.

6. The storage device according to claim 1, wherein
the correction calculation includes an eccentricity correction calculation for calculating an eccentricity correction value for correcting the position of the head so that the position of the head is on a track of the storage medium.

7. The storage device according to claim 6, wherein
the first control unit carries out control of a head position based on the positional information and the eccentricity correction value.

8. The storage device according to claim 1, wherein
the second digital signal processor has a table that stores values of a sine function and a cosine function with respect to angles of several servo frames, and carries out the correction calculation by Fourier transform using the table.

9. The storage device according to claim 1, wherein
the first digital signal processor has a table that stores values of a sine function and a cosine function with respect to an angle of n-th (n is an integer) power of 2 pieces, and carries out the demodulation calculation based on the table.

10. The storage device according to claim 1, wherein
the servo information is phase-modulated.

11. The storage device according to claim 1, wherein
the first control unit is an MPU.

12. The storage device according to claim 1, wherein
the first control unit is a digital signal processor.

13. The storage device according to claim 1, further comprising:
a second control unit that controls a host interface and instructs the first control unit based on a command from a host received by the host interface.

14. The storage device according to claim 13, wherein
the second control unit is an MPU.

15. A control device comprising:
a first digital signal processor;
a second digital signal processor; and a first control unit that controls a position of a head with respect to a storage medium, wherein the first control unit is provided separately from and instructs the first digital signal processor and the second digital signal processor, the first digital signal processor carries out at least any of a demodulation calculation that is a calculation relating to demodulation of servo information and a digital filter calculation based on an instruction from the first control unit, the second digital signal processor carries out a correction calculation that is a calculation relating to a correction of the position of the head based on the instruction from the first control unit, and the first control unit controls the position of the head based on a result of the calculation carried out by the first digital signal processor and the second digital signal processor.

16. The control device according to claim 15, wherein
the demodulation calculation calculates positional information of the head by demodulating the servo information read out from the storage medium by the head.

17. The control device according to claim 15, wherein
the second digital signal processor carries out the correction calculation based on positional information calculated by the first digital signal processor.

18. The control device according to claim 15, wherein
the correction calculation includes an imaginary circle correction coefficient calculation that calculates an imaginary circle correction coefficient for correcting the position of the head so that a track in the storage medium becomes a circle centering on a rotational center of the storage medium.

19. The control device according to claim 18, wherein
the correction calculation includes an imaginary circle correction calculation for correcting the positional information based on the imaginary circle correction coefficient.

20. The control device according to claim 15, wherein
the correction calculation includes an eccentricity correction calculation for calculating an eccentricity correction value for correcting the position of the head so that the position of the head is on a track of the storage medium.

* * * * *